Figure 1:
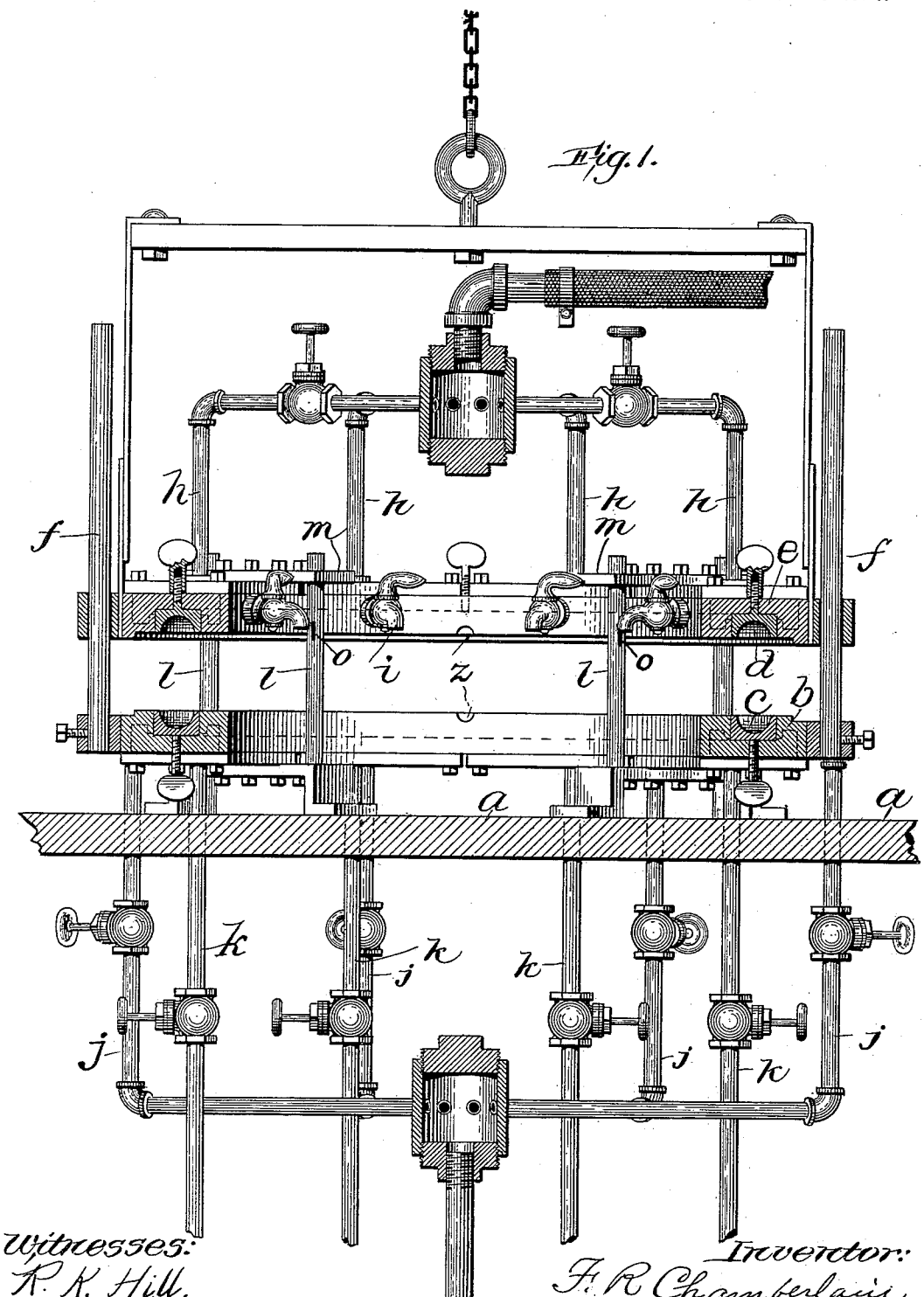

No. 620,695. Patented Mar. 7, 1899.
F. R. CHAMBERLAIN.
MACHINE FOR VULCANIZING BICYCLE TIRES.
(Application filed Dec. 17, 1898.)
(No Model.) 3 Sheets—Sheet 1.

Witnesses:
R. K. Hill.
A. J. Dailey.

Inventor:
F. R. Chamberlain
By
Crossley & Goddard,
attys.

No. 620,695. Patented Mar. 7, 1899.
F. R. CHAMBERLAIN.
MACHINE FOR VULCANIZING BICYCLE TIRES.
(Application filed Dec. 17, 1898.)
(No Model.) 3 Sheets—Sheet 2.
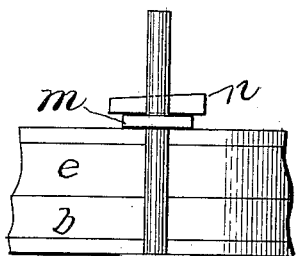
Fig. 4.
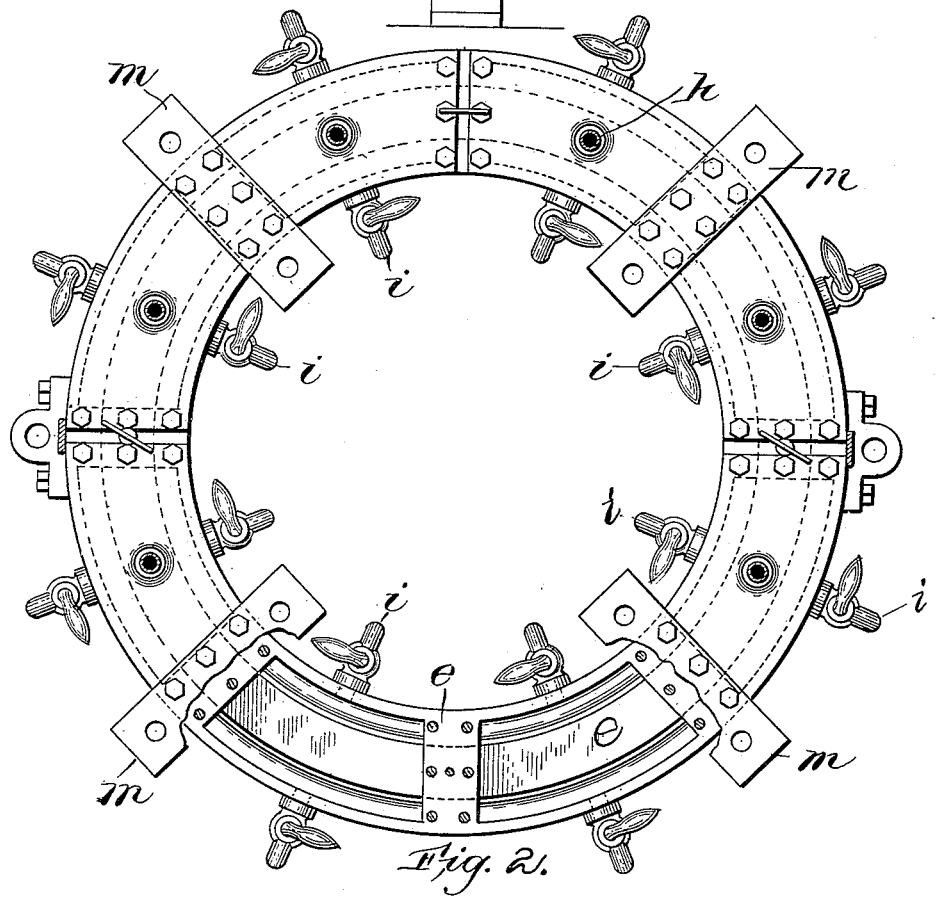
Fig. 2.
Fig. 3.
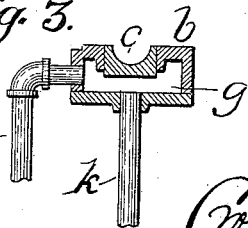
Witnesses:
Arthur F. Randall
Annie J. Dailey
Inventor:
F. R. Chamberlain
By Crosby & Goddard,
attys No. 620,695. Patented Mar. 7, 1899.
F. R. CHAMBERLAIN.
MACHINE FOR VULCANIZING BICYCLE TIRES.
(Application filed Dec. 17, 1898.)
(No Model.) 3 Sheets—Sheet 3.

Witnesses:
R. K. Hill.
A. J. Dailey

Inventor:
F. R. Chamberlain
By Crossley & Goddard,
attys.

UNITED STATES PATENT OFFICE.

FRANK R. CHAMBERLAIN, OF NEWTON, MASSACHUSETTS, ASSIGNOR TO THE NEWTON RUBBER WORKS, OF SAME PLACE.

MACHINE FOR VULCANIZING BICYCLE-TIRES.

SPECIFICATION forming part of Letters Patent No. 620,695, dated March 7, 1899.

Application filed December 17, 1898. Serial No. 699,560. (No model.)

*To all whom it may concern:*

Be it known that I, FRANK R. CHAMBERLAIN, of Newton, in the county of Middlesex and State of Massachusetts, have invented certain new and useful Improvements in Machines for Vulcanizing and otherwise Treating Bicycle-Tires, of which the following is a description sufficiently full, clear, and exact to enable those skilled in the art to which it appertains or with which it is most nearly connected to make and use the same.

This invention has relation to contrivances for patching or mending pneumatic tires for bicycle and other wheels.

In performing the work of patching or repairing tires it is usual to employ rubber or a similar substance as a cement either alone or in connection with other material or substance. The repair to be made is likely to occur at any point or place in the tire, and as it is necessary to the performance of good and acceptable work that the patch or repaired place should be vulcanized it is difficult to properly support the tire while the vulcanization is being effected, and in addition to this the present commonly-employed means are liable to distort and misshape the tire and either vulcanize beyond the limits desired or not reach far enough. Other difficulties and objections are also encountered, all tending to the waste of time and to the creation of imperfection in the product.

It is the purpose of this invention to provide a remedy for the mischiefs and difficulties mentioned, and this is done in the provision of a machine consisting of two rings each equipped with a mold to receive one-half of the tire under repair, so that the half-round matrix of each of the molds of the two rings may form one complete mold for the tire. Each ring so constructed is divided segmentally into independent vulcanizing-sections, and one of the rings is adapted to be raised and lowered, so that a patched tire may be put into place in and removed from the mold, as desired. Means are connected with the segmental sections for turning on and shutting off the heat in the shape of steam, hot air, or the like, and the machine is otherwise provided with means for rendering it useful.

Reference is to be had to the annexed drawings and to the letters marked thereon, forming a part of this specification, the same letters designating the same parts or features, as the case may be, wherever they occur.

Figure 2A:
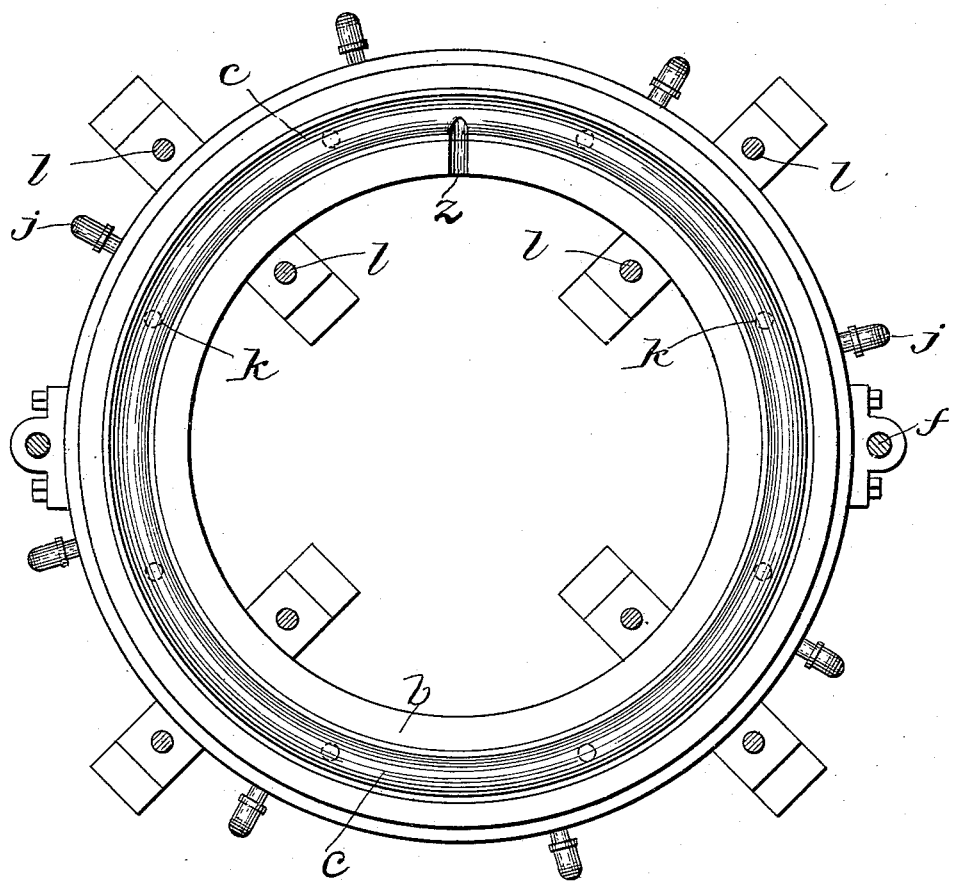

Of the drawings, Figure 1 is a vertical central sectional view of the machine complete, embodying the improvements. Fig. 2 is a plan view of the same. Fig. 2$^a$ is a plan view of one of the rings or molds disconnected. Fig. 3 is a detail sectional view through one of the heating-chambers, showing the intake and the offtake for the heat. Fig. 4 is a detail view showing a way of clamping the two rings carrying the matrices together.

In the drawings, $a$ designates the frame of the machine.

$b$ designates a ring supported by the bed, which ring embraces in its construction, among other things, a mold having a half-round matrix $c$ in the shape of a complete ring and adapted to match the half-round matrix $d$ in the ring $e$ directly over the ring $b$. The ring $b$, as hereinbefore indicated, is fixedly supported, while the ring $e$ is capable of being raised and lowered and is guided in such movements by the vertical guide-rods $f$, secured at their lower ends to the adjuncts of the ring $b$ and passing through holes formed in similar parts of the ring $e$.

The mold of each ring has a chamber $g$ formed in it for the reception of steam or hot air to heat the mold in order to vulcanize the rubber or other substance contained therein. This heating-chamber is divided into sections in the form of segments of the mold. In the present instance each of the two rings is divided into eight sections, and each section has an independent steam intake and a similar outtake. The intakes for the mold of the ring $e$ are designated by the letter $h$ and the outtakes for the same ring by the letter $i$, while $j$ designates the intakes for the mold $b$, and $k$ designates its outtakes. Proper valves are provided for the intakes and cocks or faucets for the outtakes.

In Fig. 1 the upper ring and its mold are shown as in raised position and in position to receive a patched tire for vulcanization in whole or of any part thereof. Supposing that a tire has been patched or mended at several points, with the ring $e$ raised, as shown in Fig. 1, the said tire will be placed in the lower matrix of the mold $b$, with the inflating-tube extending through an opening $z$ in the mold, and the upper ring and its mold will be let down, so that the matrix $d$ will match exactly with the matrix $c$ and so inclose the patched tire between the matrices of the mold. In letting down the upper ring the guide-rods $l$, which pass through holes in the stay-plates $m$ on the upper face of the upper ring, will come in position, so that keys $n$ may be passed through slots $o$ formed in said guide-rods $l$, and in this way key the two molds tightly together. After this has been done the tire will be inflated to a proper degree, and note having been previously taken of the points at which the tire in the molds is patched steam or heat will be turned on at such patched points and the molds heated so as to vulcanize the rubber in the patches and at the patched points only. If a patch were made completely around the tire at a particular point, steam or heat would be admitted to the heating-chambers of both molds in the section where the patch happened to fall; but if a patch were made simply on one side of the tire steam would be turned on on that side in the section where the patch rested and the heat would be kept up until the tire was sufficiently vulcanized.

The outtakes for the steam admitted to the chambers of the lower mold consist of pipes which discharge steam at a distance while the outtakes of the upper mold are shown in the drawings as consisting of faucets, which may discharge the steam within the center of the rings or mold, or in letting down the upper ring the mouth or outlet of the faucet or outtake $i$ may be brought into contact with the pipe leading to a distant point, so that the steam discharged through the faucet or outtake $i$ may be conveyed away and discharged the same as has been described with reference to the outtakes $j$.

With the invention described a pneumatic or cushion tire may not only be mended without distorting the tire at the point where it is patched, but the form of the tire may also be maintained intact, and, indeed, improved throughout if it should become misshapen to any extent. Furthermore, only that portion of the tire that has had fresh vulcanized rubber applied thereto is vulcanized, and again the vulcanization can be rendered even or uniform and it can be as completely and exactly accomplished as in the making of an absolutely new tire.

Having thus explained the nature of the invention and described a way of constructing and using the same, though without attempting to set forth all of the forms in which it may be made or all of the modes of its use, it is declared that what is claimed is—

1. A machine for vulcanizing and otherwise treating bicycle-tires, in the process of repairing the same, comprising in its construction a half-mold and a movable half-mold, both for the entire tire, and means for applying heat to any particular part of the said molds, leaving the remainder without the application of heat.

2. A machine for vulcanizing and otherwise treating bicycle-tires, in the process of repairing the same, comprising in its construction a half-mold and a movable half-mold both for the entire tire, each mold being provided with a heating-chamber divided into matching segmental sections, and each segmental sectional heating-chamber being provided with a steam intake and offtake.

3. A mold for a bicycle-tire divided longitudinally, each mold being provided with a matrix to receive half of the tire, and means for applying heat to any particular part of the said molds, leaving the remainder without the application of heat.

4. A bicycle-tire mold provided with a heating-chamber divided into segmental sections, and independent means for admitting heat to each of said sections.

5. A machine for vulcanizing and otherwise treating bicycle-tires, in the process of repairing the same, comprising in its construction a mold divided longitudinally into halves, and each mold provided with a matrix adapted to receive half of the tire, one of said molds being stationary, while the other is movable into and out of matching position with the stationary mold, and means for applying heat to any particular part of said molds.

6. A mold for repairing bicycle-tires provided with a heating-chamber divided into segmental sections, each section being provided with an independent steam intake and offtake.

In testimony whereof I have signed my name to this specification, in the presence of two subscribing witnesses, this 23d day of November, A. D. 1898.

FRANK R. CHAMBERLAIN.

Witnesses:
FRANK E. HALL,
E. EDWIN ALDEN.